United States Patent
Lorah et al.

(10) Patent No.: US 7,109,257 B2
(45) Date of Patent: Sep. 19, 2006

(54) MODIFIED CLAYS AND METHODS FOR MAKING AND USING SAME

(75) Inventors: Dennis Paul Lorah, Lansdale, PA (US); Robert Victor Slone, Ambler, PA (US); George Max Lein, Chalfont, PA (US)

(73) Assignee: Rohm and Haas Company, Philadelphia, PA (US)

( * ) Notice: Subject to any disclaimer, the term of this patent is extended or adjusted under 35 U.S.C. 154(b) by 190 days.

(21) Appl. No.: 10/254,167

(22) Filed: Sep. 25, 2002

(65) Prior Publication Data

US 2003/0060555 A1    Mar. 27, 2003

Related U.S. Application Data

(60) Provisional application No. 60/325,296, filed on Sep. 27, 2001.

(51) Int. Cl.
C08K 9/04    (2006.01)
C08K 3/34    (2006.01)

(52) U.S. Cl. .................. 523/216; 524/186; 524/445; 524/446; 524/447; 524/449; 501/145; 501/147; 501/148

(58) Field of Classification Search ........... 524/186, 524/445, 447, 446, 449; 501/145, 147, 148; 523/216

See application file for complete search history.

(56) References Cited

U.S. PATENT DOCUMENTS

| 5,336,647 | A   | 8/1994 | Nae et al. |
| 5,429,999 | A   | 7/1995 | Nae et al. |
| 6,414,069 | B1* | 7/2002 | Pinnavaia et al. .......... 524/445 |
| 6,674,009 | B1* | 1/2004 | Fomperie et al. ....... 174/110 R |
| 6,914,095 | B1* | 7/2005 | Lorah et al. ................. 524/445 |

OTHER PUBLICATIONS

Makoto Ogawa and Kazuyuki Kuroda. "Preparation of Inorganic-Organic Nanocomposites through Intercalation of Organoammonium Ions into Layered Silicates", Bull. Chem. Soc. Jpn, 70, 2593-2618 (1997).

* cited by examiner

*Primary Examiner*—Tae H. Yoon
(74) *Attorney, Agent, or Firm*—Andrew E. C. Merriam

(57) ABSTRACT

Processes for modifying the surface chemistry of a clay are disclosed. In one embodiment, there is provided a process for modifying the surface chemistry of a clay, wherein the process comprises: providing a clay dispersion comprising at least one unmodified clay wherein said clay has a first exchangeable cation; adding a second cation to the clay dispersion, wherein at least a portion of the second cation exchanges with at least a portion of the first cation to form a modified clay dispersion; and combining at least one polar containing agent with the modified clay dispersion to provide a modified clay.

16 Claims, No Drawings

MODIFIED CLAYS AND METHODS FOR MAKING AND USING SAME

This application claims benefit of U.S. Provisional Application Ser. No. 60/325,296 filed on Sep. 27, 2001.

The present invention relates generally to hydrophobically modified clays. More particularly, the present invention relates to methods of modifying clays using a multivalent cation and acid functional organics. This invention also relates to the use of these modified clays by themselves or within polymer clay nanocomposites that are used, for example, in coatings, adhesives, thickeners, binders, engineering plastics, and other compositions.

One way of improving polymer properties is by adding a clay material to polymers to form composite materials. However, incorporating clays into polymers may not provide a desirable improvement in the physical properties, particularly mechanical properties, of the polymer. This may be due, for example, to the lack of affinity between the clay and the polymer at the interface, or the boundary, between the clay and polymer within the material. In this connection, affinity between the clay and the polymer may improve the physical properties of the resulting nanocomposite by allowing the clay material to uniformly disperse throughout the polymer. The relatively large surface area of the clay, if uniformly dispersed, may provide more interfaces between the clay and polymer, and may subsequently improve the physical properties, by reducing the mobility of the polymer chains at these interfaces. By contrast, a lack of affinity between the clay and polymer may adversely affect the strength of the composition by having pockets of clay concentrated, rather than uniformly dispersed, throughout the polymer. Affinity between clays and the polymers is related to the fact that clays, by nature, are generally hydrophilic whereas polymers, such as the polymers used in the aforementioned applications, are generally hydrophobic.

Clay minerals are typically comprised of hydrated aluminum silicates that are fine-grained and have a platy habit. The crystalline structure of a typical clay mineral is a multi-layered structure comprised of combinations of layers of $SiO_4$ tetrahedra that are joined to layers of $AlO(OH)_2$ octahedra. The term Agallery@, as used herein, describes the interlayer spaces of the layered clay minerals. The terms "d-spacing" or "basal spacing", as used herein, define the sum of the single layer thickness and the thickness of the interlayer or gallery, which is the repeat unit of the multi-layer mineral. Depending upon the clay mineral, the gallery may contain water and/or other constituents such as potassium, sodium, or calcium cations. Clay minerals vary based upon the combination of their constituent layers and cations. Isomorphic substitution of the cations of clay mineral, such as $Al^{3+}$ or $Fe^{3+}$ substituting for the $Si^{4+}$ ions in the tetrahedral network, or $Al^{3+}$, $Mg^{2+}$ or $Fe^{2+}$ substituting for other cations in the octahedral network, typically occurs and may impart a net negative charge on the clay structure. Naturally occurring elements within the gallery of the clay, such as water molecules or sodium or potassium cations, are attracted to the surface of the clay layers due to this net negative charge.

Nanocomposites are compositions in which at least one of its constituents has one or more dimensions, such as length, width or thickness, in the nanometer size range. The term Ananocomposite@, as used herein, denotes the state of matter wherein polymer molecules exist among at least partially exfoliated clay layers. Recently, nanocomposites that contain layered clay materials such as montmorillonite having silicate layers of a thickness of 1 nanometer dispersed within a polymeric matrix, have been developed as a means to improve the physical properties of polymers. In order to effectively improve the physical or mechanical properties, the clay is typically uniformly dispersed throughout the polymer in order to promote more interfaces between the clay and polymer and enhance the affinity of the clay to the polymer at these interfaces. Further, if the clay is uniformly dispersed throughout the polymer, less clay material may be added to the nanocomposite composition while maintaining the physical properties of the nanocomposite.

Polymer-clay nanocomposites can be characterized as being one of several general types: intercalated nanocomposite, exfoliated nanocomposite, or combinations thereof. The term "intercalated nanocomposite", as used herein, describes a nanocomposite that consists of a regular insertion of the polymer in between the clay layers. The term "exfoliated nanocomposite", as used herein, describes a nanocomposite wherein the 1 nm-thick layers of clay are dispersed in the matrix forming a composite structure on the microscale. The latter type of composite, or exfoliated nanocomposite, maximizes the polymer-clay interactions thereby making the entire surface of the clay layers available for the polymer. This modification may lead to the most dramatic changes in mechanical and physical properties of the resultant polymer. By contrast, the term "conventional composite", as used herein, describes a composite where the clay acts as a conventional filler and is not dispersed on a nano-scale. These composites generally do not enjoy the improvement in mechanical and physical properties seen with exfoliated nanocomposites. In certain embodiments of the present invention, some portion of the clay in the polymer clay nanocomposites may exist as structures larger than exfoliated or intercalated composites.

In order to promote more affinity between the clay and the polymer at the interface and provide a uniform dispersion of the clay within the polymer, the interlayer surface chemistry of the clay may be modified to render the silicate layers less hydrophilic. Previous methods of altering the interlayer surface chemistry of the clay include the use of modifying agents, such as surfactants or silanes, to prepare a clay dispersion prior to its incorporation into a polymer. For example, surfactants may typically comprise a molecule having a hydrophilic function (which has an affinity to polar media such as water or clay) and an organophilic function (which has an affinity to organic molecules such as oil or polymer). The use of surfactants allows one to disperse clay within a polymer. As used herein, the term "hydrophobically modified clays" denotes clays that may have its surface chemistry modified through the use of an agent such as a surfactant, silane, or other modifier.

Typical agents used to render a clay less hydrophilic may include, but are not limited to, amino acids, alkylammonium ions, silanes, aminomethylstyrene, or living free radical polymerization initiator ("LFRP"). Further non-limiting examples of other suitable agents for the synthesis of nanocomposites are provided in the reference, M. Ogawa et al., "Preparation of inorganic-organic nanocomposites through intercalation of organoammonium ions into layered silicates", *Bull. Chem. Soc. Jpn.*, 70, 2593–2619 (1997).

Amino acid surfactants are molecules that may consist of a basic amino group (-$NH_2$) and an acidic carboxyl group (—COOH). When introduced into an acidic medium, a proton may be transferred from the —COOH group to the intramolecular —$NH_2$ group. It is believed that a cation exchange occurs between the —$NH_3^+$ functional group that is formed and the naturally occurring cations (i.e., $Na^+$, $K^+$, etc.) present between the clay layers. This results in an intercalated state wherein the —$NH_3^+$ functional groups are Asandwiched@ between the individual layers replacing the naturally occurring cation. The term Aintercalate@, as used herein, refers to incorporating foreign molecules, atoms, or ions in between the layers of the clay material. As a result of this intercalated state, the clay becomes organophilic. Amino acid surfactants are commonly used in the preparation of polyamide 6-clay hybrids because their acid functional group may polymerize with ε-caprolactam that is intercalated between the layers. As a result, the intragallery polymerization delaminates the clay in the polymer matrix thereby forming a nanocomposite.

Alkylammonium ion surfactants, such as onium salts, are commonly used to prepare clay dispersions for nanocomposite materials. The basic formula for a typical alkylammonium ion is $CH_3$—$(CH_2)_n$—$NH_3^+$ where n is between 1 and 18. It is believed that the alkylammonium ions also readily exchange with the naturally occurring cations present between the clay platelets resulting in an intercalated state. Further, it is believed that the alkylammonium ions may increase the d-spacing between the clay layers and also may lower the surface energy of the clay thereby allowing organic species with different polarities to become intercalated between the clay layers.

Silanes may also be used in the synthesis of unsaturated polyester-clay nanocomposites. Silanes are a family of organosilicon monomers, which may be characterized by the formula R—$SiX_3$, where R is an organofunctional group, attached to silicon in a hydrolytically stable manner and X designates hydrolyzable groups that may be converted to silanol groups upon hydrolysis. It is believed that silanes interact with inorganic surfaces such as clay that have hydroxyl groups attached primarily to silicon or aluminum thereby forming a bond with the inorganic surface.

U.S. Pat. Nos. 5,336,647 and 5,429,999 issued to Nae (referred to herein collectively as "Nae") describes organoclay compositions that are dispersible in non-aqueous fluids to impart rheological properties to these fluids. These organoclay compositions are prepared by adding a first and second organic cation to an aqueous slurry of a smectite-type clay and reacting the mixture for a sufficient time and temperature to form the organophillic clay gellant. The '999 patent further discusses adding one or more organic anions that are capable of reacting with the first and second organic cations to form an organic cation-organic anion complex with the smectite clay. Both patents do not disclose the addition of an inorganic cation to the aqueous slurry containing the clay. In comparison with inorganic cations, organic cations may be unstable in the aqueous slurry with respect to temperature. Further, Nae does not disclose the use of these organoclays in an aqueous fluid or in a polymer clay nanocomposite composition. Moreover, the organoclay compositions disclosed in Nae relate to gellation compounds. Nae does not disclose, however, low viscosity clay materials that are suitable for further processing.

It is thus surprising and unexpected to prepare modified clays which have been modified through the addition of a multivalent cation and a neutralizing agent. The term "modified clay" as used herein relates to clays whose surface chemistry have been altered. The methods of the present invention provide modified clays that may be used by themselves or within a polymer clay nanocomposite.

Modified clays produced in accordance with the methods of the present invention may preferably be provided in a form suitable for direct use in a variety of compositions or polymer clay nanocomposite compositions, such as, for example, coatings, sealants, thermosets, textiles, textile binders, caulks, adhesives, and as plastics additives. The polymer clay nanocomposites show significant property improvements at clay levels of 0.1 to 25%, such as increased tensile strength with little or no adverse effect on ancillary properties such as barrier properties, flexibility and the like. By contrast, conventional composites typically need 15–30% of a filler in order to see significant reinforcement. At this level of filler, ancillary properties like barrier properties, flexibility and the like are degraded.

The present invention is directed, in part, to modified clays and processes for preparing same. Specifically, in one embodiment of the present invention, there is provided a process for preparing a modified clay comprising the steps of providing an clay dispersion comprising at least one clay wherein the clay has a first exchangeable cation. A second cation is added to the clay dispersion wherein at least a portion of the second cation exchanges with at least a portion of the first cation to form a modified clay dispersion. At least one neutralizing agent is combined with the modified clay dispersion to provide a modified clay.

In another embodiment of the present invention, there is provided a process for preparing a modified clay which includes the steps of providing an aqueous clay dispersion comprising at least one clay wherein said clay has a first exchangeable cation; combining an aqueous mixture comprising a second cation with the aqueous clay dispersion, wherein at least a portion of the second cation exchanges with at least a portion of the first cation to form a modified aqueous clay dispersion and wherein the second cation comprises an inorganic cation; and adding at least one neutralizing agent to the modified aqueous clay dispersion to provide a modified clay wherein at least a portion of the neutralizing agent interacts with at least a portion of the second cation to form a modified clay. In certain preferred embodiments of the present invention, the second cation comprises a multivalent cation.

In a further embodiment of the present invention, there are provided coatings, adhesives, caulks, sealants, plastics additives, engineering plastics (i.e., polyesters such as poly (ethylene terephthalate), poly(butylene terephthalate), polyamides or nylons, such as polycaprolactam and poly (hexamethylene adipamide, polyethylene, polypropylene, thermosets, thermoplastics, extrudable plastics, and the like), textiles, textile binders, inks, graphic arts, and UV curable resins that comprise the modified clays of the present invention.

In yet a further embodiment of the present invention, there are provided polymer clay nanocomposites comprising the modified clays of the present invention.

These and other aspects of the invention will become apparent from the following detailed description.

The present invention is directed to processes for modifying a clay that involves the use of a multivalent cation, preferably an inorganic cation, and a neutralizing agent. In certain preferred embodiments, the clay modifier, which comprises a complex of the mulivalent cation and neutralizing agent, is intercalated within the clay. As a result, it is believed that the d-spacing of the clay is increased. The term neutralizing agent, as used herein, relates to an agent that has a partially or fully negative charge. The present modified clays provide certain advantages in comparison to other modified clays of the prior art. In particular, the modified clays of the present invention may have functional groups that allow the modified clay to participate in polymerization when used, for instance, in a polymer clay nanocomposite composition. Further, the modified clays of the present invention may have a surface chemistry that enhances the affinity of the clay to a polymer within a polymer clay nanocomposite composition. In addition, the modified clays of the present invention may exhibit greater thermostability over clays modified by other means such as onium salt modifying agents because onium salts undergo Hoffman elimination upon heating.

It has now been found that the addition of a multivalent cation, typically a metal cation, to form a complex with a neutralizing agent on the surface of the clay, may desirably foster the attraction between the negatively charged functional groups within the neutralizing agent and the clay surface. It is believed that at least a portion of the neutralizing agent is ionically attracted to at least a portion of the multivalent cation residing on the surface of the clay. This attraction between the neutralizing agent and cation results in a modified clay with improved properties depending upon the end use of the clay. Depending upon the system and the desired end use, the complex of the neutralizing agent and cation may render the surface chemistry of the modified clay either more hydrophillic or more hydrophobic. Further, this complex may also allow the modified clay to be more readily dispersible in an aqueous or solvent based solution. Moreover, the modified clays of the present invention may be more readily formulated into compositions, such as engineering plastics, compared with clays modified by other means such as onium salts.

The present invention relates to an improved modified clay. The modified clay is prepared by providing a clay dispersion comprising at least one clay having a first exchangeable cation. A second cation, preferably a multivalent inorganic cation, is added to the clay dispersion either in a mixture or neat (i.e., without water or solvent) to form a modified clay dispersion. This modified clay dispersion is further reacted with an at least partially negative neutralizing agent to form the modified clay. As a result, the modified clay may possess some of the attributes of the neutralizing agent selected.

The modified clays of this invention may be prepared by admixing a clay dispersion, having a first cation, with a second cation and a neutralizing agent. Preferably, the clay dispersion and second cation and neutralizing agent are mixed at temperatures that range from 10 to 150° C., preferably from 20 to 100° C., and more preferably from 50 to 90° C. for a period of time sufficient for the second cation to exchange with the first cation to form a modified clay dispersion, and for the neutralizing agent to be attracted to the second cation. The first cation, second cation, and neutralizing agent may be added simultaneously or at separate steps in any order. Preferably, the second cation and neutralizing agent are added in an aqueous mixture. The amount of second cation and neutralizing agent added to the clay is preferably sufficient to impart to the clay the desired characteristics. The modified clay may then be removed from the dispersion through filtration, washing, drying, and/or grinding.

Suitable clays for the clay dispersion include any natural or synthetic layered mineral capable of being intercalated or exfoliated. Examples of such clays may include, for example, layered silicate minerals. The layered silicate minerals that may be employed include natural and synthetic minerals capable of forming intercalation compounds. Examples of some naturally occurring minerals include, but are not limited to those known as, smectite, phyllosilicate, montmorillonite, saponite, beidellite, montronite, hectorite, stevensite, vermiculite, kaolinite and hallosite. Preferably among these minerals is montmorillonite. Some non-limiting examples of synthetic minerals, or synthetic phyllosilicates, may include LAPONITE®, which is manufactured by Laporte Industries, Ltd. of Charlotte, N.C., magadiite, and fluorohectorite.

Clays typically have at least one naturally occurring cation, or first cation, such as potassium, calcium, or sodium, present within their galleries that are attracted to the net negative charge of the clay surface. For example, clays like montmorillonite may be mined with a naturally occurring cation such as sodium or calcium. The terms Asodium form@ or Acalcium form@ refer to clays that have an exchangeable cation which is primarily sodium or calcium, respectively.

The cationic exchange capacity (ACEC@) of the clay relates to the ion exchange capacity of the clay, or the total quantity of positive charge that can be absorbed onto the clay surface, expressed in terms of positive charges per unit mass of colloidal particles. Some CEC values for exemplary clay materials are as follows: montmorillonite clays range from 70 to 150 meq/100 g; hallosite clays range from 40 to 50 meq/100 g; and kaolinite clays ranges from 1 to 10 meq/100 g. In certain embodiments of the present invention, the clays selected preferably have higher CEC values. In preferred form, clays used in the present invention may have a CEC capacity of about 40 meq/100 g or greater, preferably a CEC capacity of about 70 meq/100 g or greater, more preferably a CEC capacity of about 90 meq/100 g or greater, and even more preferably a CEC capacity of 100 meq/100 g or greater. In certain embodiments of the present invention, the CEC capacity of the clay may be increased by electrochemically reducing the clay.

Clay dispersions may be prepared by subjecting a clay mixture, dispersed in an aqueous or other liquid medium, comprising at least one unmodified clay to shearing forces such as by mechanical mixing to partially and/or fully exfoliate the clay. Various high shearing methods to disrupt the physical integrity of clay particles in water to at least partially exfoliate the clay without requiring a modifying agent such as a surfactant are also envisioned. These methods include, but are not limited to, ultrasonication, megasonication, grinding/milling, high speed blending, homogenization, and the like. The clay dispersion may also be subjected to shearing forces at temperatures which range from 10 to 150° C., preferably from 20 to 100° C., and more preferably from 50 to 90° C. to further aid in exfoliating the clay layers. Although such high shearing methods may be used in the process of the present invention, these methods are not required to achieve an at least partially exfoliated state. In the various embodiments of this invention, the clay may include both exfoliated clay layers and non-exfoliated clay particles. In certain embodiments of the present invention, homogenization of the clay dispersion is not required.

In the present invention, the clays within the clay dispersion may be either partially or completely exfoliated. Preferably, the clay is an at least partially exfoliated clay. The term Aat least partially exfoliated clay@, as used herein, generally refers to clay in which the layers have been completely or partially separated from one another. By contrast, the term Anon-exfoliated clay@ generally refers to the physical state of clay which does not exist as separated layers. The term "intercalated" generally refers to the state where polymers are interposed between the layers of the clay within the system. The term "partially intercalated" generally refers to the state wherein some of the clay layers within the system have polymer in between the layers and other clay layers do not. Any of the various states of polymer and clay systems may be used in the present invention.

Typically, the dispersions of completely ("fully") exfoliated clay are quite viscous and/or gelatinous at clay concentrations greater than a few percent. It should be appreciated to those skilled in the art that the exact weight percent (concentration) of clay which forms such a highly viscous gel depends on a number of factors, including but not limited to clay type, temperature, pH, and the like. Typically, the clay dispersion forms a free-flowing liquid slurry rather than a viscous gel.

In the present invention, limiting the degree of exfoliation to less than 100% complete, i.e. partial exfoliation (less than 100%) typically provides clay dispersions that have reduced viscosities and/or a non-gelled liquid state. Hence, the portion of the clay that is exfoliated into clay layers typically provides the major contribution to viscosity increase while the non-exfoliated portion (i.e., clay particles) provides a minor contribution to the viscosity increase. Accordingly, the total amount of partially exfoliated clay in a clay dispersion is typically less than a few percent by weight, preferably 5% or less, more preferably 4% or less, and even more preferably 3% or less, based on the total weight of the dispersion. It is contemplated that the reduction of viscosity of the clay dispersion may be aided by dispersants, such as, but not limited to polyphosphates.

Often, moderate mechanical mixing not requiring high shear may be suitable to provide dispersions of an at least partially exfoliated clay in water or other liquid medium. When fully exfoliated clays cause processing problems associated with the presence of high viscosities and/or gels in the reaction media, the degree of exfoliation should be less than complete. Likewise, to achieve the desired chemical and physical properties, the clay should be at least partially exfoliated. As well, the step of shearing clays in an aqueous or other liquid medium typically results in a viscosity increase. Usually, the greater the degree of exfoliation the greater the increase in viscosity.

Besides increasing the degree of exfoliation of the clay, increasing the clay concentration within the clay dispersion may also result in increased viscosities. To this end, viscosity may be controlled by dilution of the reaction media and/or clay dispersion by a suitable liquid, such as water. Typically, it may be desirable to control the viscosity of reaction media and/or clay dispersion by dilution prior to the polymerization step(s). For example, to obtain a high level of clay enrichment in the nanocomposites of the present invention (e.g., clay amounts greater than 5% based on total weight polymer within the nanocomposite), the reaction media may be diluted with a sufficient amount of water beforehand to reduce the viscosity. The amount of dilution that is necessary to achieve a particular viscosity level may be readily determined by those skilled in the art. Typically, to obtain a sufficient viscosity range prior to adding subsequent reactants, the solids concentration of the reaction media may be controlled to less than 40%, and more typically less than 30%. In some embodiments, the viscosity of the dispersion prior to adding the reactants may range up to 5,000 centipoises (Acps@) using a Brookfield Viscometer and measured using a number 3 spindle at 60 revolutions per minute (Arpm@).

Hydrophobically modified may also be used with the methods of the present invention. In certain embodiments of the present invention, the clays may be at least partially hydrophobically modified. As mentioned earlier, modifying agents such as surfactants modify the surface chemistry of the clays, for example, by ion exchanging with the naturally occurring cations present within the clay. This results in an Aintercalated@ state wherein the surfactant is Asandwiched@ between the individual layers replacing the naturally occurring cation. Exemplary surfactants may include anionic, cationic, or nonionic surfactants having a hydrophilic head group and at least one oleophilic tail wherein the tails are selected from hydrogen and alkyl, alkenyl, and alkynyl groups having about 4 to about 30 carbon atoms. Preferably, the surfactant used with the methods of the present invention are cationic surfactants. The term Acationic surfactant@, as used herein, describes surfactants wherein the hydrophobic or hydrophillic moiety, preferably hydrophillic, carries a positive charge when dissolved in an aqueous media. Representative cationic surfactants may include onium salts such as, for example, salts comprising quaternary ammonium, quatenary phosphonium, or tertiary sulfonium cations or aliphatic mono-, di-, and polyamines derived from fatty and rosin acids. In the representative surfactants provided, the positive charge generally resides on an amino or quaternary nitrogen. Further examples of surfactants suitable for use in the present invention are provided in *McCutcheon's Detergents and Emulsifiers* (MC Publishing Co., Glen Rock, N.J.), published annually.

In certain embodiments, the present invention may use a redox process to aid in the modification of the clay surface. A relatively large percentage of the weight of clay, typically 2% by weight or greater, comprises redox-active multivalent metal ions such as iron, copper, manganese, and the like, that are present within the galleries and/or the surface layers of the clay. These redox-active multivalent metal ions, inherent within the clay or added to the system, may be used to accelerate radical generation from redox-active initiator components. In the redox process, a clay containing metal ions such as $Fe^{II}$ or $Fe^{III}$ may be reacted in the presence of either an oxidant or a reductant. Exemplary oxidants may include, but are not limited to, persulphate, azo, peroxide (e.g., hydrogen peroxide, t-butyl hydroperoxide, t-amylhydroperoxide), and the like. Exemplary reductants may include, but are not limited to, sodium metabisulphite, sodium bisulfite, sodium sulfoxylate formaldehyde, sodium dithionite, isoascorbic acid, sodium hydrosulphite, 2-hydroxy-2-sulfinatoacetic acid, 2-hydroxysulfonatoacectic acid, and the like.

In the redox process wherein a clay with $Fe^{II}$ is reacted in the presence of an oxidant, a chemical reductant is added to a reaction mixture containing clay in its natural $Fe^{III}$ form and, optionally, a surfactant. Preferably, the amount of reductant added is in a sufficient quantity to reduce every mole of iron contained within the clay. Confirmation of the reduction of the clay from its $Fe^{III}$ to $Fe^{II}$ form may be made by observing a color change of the reaction mixture. The reaction mixture may become gray/green in appearance. The reduction of $Fe^{III}$ within the clay plates will increase the negative charge density on the plates. Conversely, the use of an oxidant will decrease the negative charge density on the plates. In this manner, the redox process may be used to alter the CEC value of the clay.

As mentioned earlier, the clay material present within the clay dispersion includes a first cation residing between the clay layers. Alternatively, the first cation may be present as counter-ion to the anion within the surfactant. This first cation may comprise naturally occurring cations that are present within the galleries of the clay mineral, such as sodium, potassium, or calcium cations, and/or surfactants, preferably cationic surfactants. For example, the first cation may comprise from 40 to 200 meq/100 g clay, more preferably from 80 to 150 meq/100 g of clay. In certain embodiments, the onium hydrophobically modified clay is more preferred.

A second cation, preferably a multivalent cation, more preferably at least one divalent or trivalent cation, and even more preferably at least one divalent or trivalent metal cation such as but not limited to Ca, Mg, Cu, Mg, Fe, or Zr, is added to the clay dispersion. Preferably, the second cation does not comprise an onium cation or a cationic surfactant. The addition of the second cation to the clay dispersion results in a modified clay dispersion. The cation is preferably soluble, i.e., is present at a level such that all of the cation may dissolve in a solvent. In preferred embodiments, the solvent is water and the cation is water soluble.

The second cation may preferably be added in the form of a slurry or solution. In certain embodiments of the present invention, the second cation is added in the form of a solution containing an inorganic metal salt comprising at least one divalent and/or trivalent cations. Preferably, the metal salt is dissolved in water or other solvent. Examples of such metal salts include, but are not limited to, $Ca(OH)_2$, $Mg(OH)_2$, or $Mg(SO_4)$. Further non-limiting examples of metal salts, comprising divalent or trivalent cations, are provided in U.S. Pat. No. 5,998,538. The selection of the second cation is influenced by the final use of the modified clay whereas the selection of the anion may influence the solubility. The amount of the second cation that is added to the clay dispersion ranges from 10 to 200% on CEC, more preferably from 50 to 200% on CEC, and even more preferably from 95 to 125% on CEC, based upon the CEC value of the clay. Elevated temperatures are preferred to favor the exchange of the second cation with the first exchangeable cation. However, the second cation may exchange with the first exchangeable cation at room temperature, i.e. temperatures of 25EC or greater.

In accordance with the present invention, at least a portion of the second cation effectively ion exchanges with at least a portion of the first cation. The second cation does not need to completely exchange with the first cation. In certain embodiments, the degree of exchange may be determined, for example, in a latex by isolating the polymer from the aqueous phase and analyzing the aqueous phase by standard techniques, such as, for example, quantitative atomic absorption.

The selection of the second cation to be added to the clay dispersion is dependent, for example, upon the desired properties or intended end use. Preferably, at least a portion of the second cation should differ from at least a portion of the first cation to effectively ion exchange. For example, in a system where the first cations comprise sodium, calcium, and cationic surfactant, a divalent cation, such as calcium, will typically exchange first with the sodium cation and next with the cationic surfactant. The first calcium cation is not expected to exchange with the second calcium cation but rather reaches an equilibrium state; therefore if the first cation is completely comprised of calcium, no exchange will be evident. For example, the reference AIon Exchange Interaction of Quaternary Alkylammmonium Cations with Sodium and Calcium Forms of Montmorillonite@, A. I. Zhukova et al., Ukr. Khim. Zh., 1975, 41(7), 696–699, describes that the naturally occurring calcium cation in the montmorillonite clay is bonded more firmly than the surfactant cations, $Me_4N^+$ or $BuNH_3^+$. The rate of ion exchange varies depending upon a variety of factors such as the relative amounts of first and second cations within the system, the relative sizes of the cations to be exchanged, and/or the amount of water molecules present within the galleries. Since the exchange of the first and second cation is reversible, in certain preferred embodiments of the present reaction, the forward reaction, or the exchange of the second cation for the first cation, preferably occurs rather than the reverse reaction.

In some embodiments of the present invention, a clay may be modified by an acid ion exchange process. The term "acid ion exchange process", as used herein, comprises adding an ion exchange resin to the clay to render the clay more acidic by exchanging hydrogen ions for cations on the surface of the clay. The term "acid clay", as used herein, refers to a clay that is treated with an ion exchange resin. Ion exchange resins are generally polymeric compounds that contain positively or negatively charged chemical reactive groups that can attract an ion of opposite charge from a surrounding solution. The electrically charged groups may include, for example, sulfonic or carboxylic acid salts or quaternary ammonium salts. Polymers containing acid groups are generally classified as "acid", or "cation exchangers", because they exchange positively charged ions, such as hydrogen ions and metal ions; polymers containing ammonium groups are generally classified as "basic", or "anion exchangers", because they exchange negatively charged ions, usually hydroxide ions or halide ions. Some non-limiting examples of ion exchange resins include styrene-divinylbenzene copolymers, methacrylic acid-divinylbenzene polymers, and phenol-formaldehyde polymers. Further examples of ion exchange resins are provided in Robert Kunin, *Ion Exchange Resins*, 2nd ed. (1958, reprinted 1990). Preferably, a cation exchange resin such as AMBERLITE® IRN-77, which is manufactured by Rohm and Haas Co. of Philadelphia, Pa., may be used in certain embodiments of the present invention. The amount of ion exchange resin, which is preferably added to the clay dispersion in large excess depending upon batch size, is preferably from 50,000% to 100%, more preferably from 10,000% to 1,000%, and even most preferably from 8,000% to 4,000% by weight, based upon the dry weight of the clay in the dispersion.

In certain embodiments of the present invention, an acid clay may be prepared. In this connection, an acid clay may be prepared by providing a dispersion containing one or more clays, deionized water, and an ion exchange resin. The dispersion is stirred for a certain time and temperature. Preferably, the dispersion is stirred for a period of 2 to 24 hours, preferably 4 to 12 hours, and even more preferably 6 to 10 hours. The temperature conditions at which the dispersion is stirred is preferably from 20° C. to 120° C., more preferably from 50° C. to 100° C., and most preferably from 60° C. to 80° C. The ion exchange resin is removed from the dispersion, preferably through filtration or similar means, to provide an acid clay and water mixture.

In certain embodiments of the present invention, the clay within the acid clay and water mixture may be modified through exposure to a multivalent cation, such as any of the multivalent cations disclosed herein. It is believed that the multivalent cation interacts with the acid clay by ion exchanging protons.

The aqueous solution having the multivalent cation and the acid clay and water mixture, or the combined mixture, are stirred under certain time and temperature conditions to modify the clay. The temperature conditions at which the combined mixture is stirred is from 60° C. to 120° C., more preferably from 70° C. to 110° C., and most preferably from 80° C. to 100° C.

In accordance with the methods of the present invention, a neutralizing agent is combined with, or added to, the modified clay dispersion to react with the second cation contained therein. The amount of neutralizing agent that is added to the system is in an amount sufficient to neutralize the charge of the multivalent cation within the system. The term "neutralize", as used herein, refers to balancing a positive charge with a negative charge. In general, the amount of neutralizing agent that is reacted with the modified clay dispersion comprising the second cation must be sufficient to obtain a milliequivalent ratio of second cations to neutralizing agent in the range of from 0.25:1.0 to 50:1.0, preferably from 1.0:1.0 to 15:1.0. The neutralizing agent may be selected from a wide range of materials that are capable of reacting with the second cation present in the modified clay dispersion in order to form a cation and neutralizing agent complex on the surface of the clay. The molecular weight of the neutralizing agent is preferably 3,000 or less, and more preferably 1,000 or less, and contains at least one anionic moiety per molecule so as to permit the formation of the multivalent cation and neutralizing agent complex on the surface of the clay.

Examples of neutralizing agents that may be used include, for example, chloride, bromide, iodide, hydroxyl, nitrite and acetate, used in amounts sufficient to neutralize the second cation. Preferably, the neutralizing agents used in the present invention are derived from carboxylic acids, such as stearic acid, oleic acid, palmitic acid, succinic acid, tartaric acid, etc.; fatty acids; amino acids; sulfonic acids; and alkyl sulfates, such as the lauryl half ester of sulfuric acid. The neutralizing agent, which may include mixtures of organic anions, is reacted with the second cation on the surface of the clay to form the desired modified clay.

The neutralizing agent may be added to the reaction mixture in acid or salt form. Further, the neutralizing agent may be dispersed in a mixture or added neat. In embodiments where the neutralizing agent is added in the salt form include alkali metal salts, alkaline earth salts, ammonium and organic amines. Representative salts of the neutralizing agent are those formed with hydrogen, lithium, sodium, potassium, magnesium, calcium, barium, ammonium and organic amines such as ethanolamine, diethanolamine, triethanolamine, methyldiethanolamine, butyldiethanolaine, diethylamine, dimethylamine, triethylamine, dibutylamine, and so forth, and mixtures thereof. The most preferred salt form is sodium.

In other embodiments of the present invention, the neutralizing agent may comprise polar oligomers or unsaturated oligomers, such as trimers, that have a partially or completely negative charge and which have one or more points of unsaturation, such as terminal unsaturation. In certain other embodiments of the present invention, the polar monomer relates to low molecular weight polymeric stabilizers that may be soluble in base (i.e., contain many $CO_2H$ groups and are alkali soluble). Some non-limiting examples of these polar, polymeric stabilizers include MOREZ™ 101 or TAMOL™ 731, both of which are manufactured by Rohm and Haas, Inc. of Philadelphia, Pa. In these embodiments, the amount of polar stabilizer within the system may vary depending the amount of neutralizing agent required to neutralize the charge of the second cation.

In further embodiments of the present invention, the neutralizing agent may comprise a polymerizable surfactant having a partially or completely negative charge. A polymerizable surfactant, as used herein, is a surfactant that is capable of co-polymerizing with an ethylenically unsaturated monomer. Exemplary polymerizable surfactants include, but are not limited to, the ethylenically unsaturated amine salts of alkylbenzene sulfonic acids, alkyl olefin sulfonic acids, alkyl alcohol sulfuric acid esters, alkoxylated alkyl alcohol sulfuric acid esters, fatty acids, and fatty phosphate acid esters, or mixtures thereof, described in W/O 98/32773, 00/05950, 00/06611 and 00/06612.

The modified clays prepared according to the present invention may be useful, for example, as coatings, sealants, caulks, adhesives, and as plastics additives. The coating compositions comprising aqueous nanocomposite clay-polymer dispersions may exhibit improved properties like block, print and dirt pick-up resistance, enhanced barrier properties, and enhanced flame resistance. Additionally, the coating compositions comprising the aqueous nanocomposites of the present invention may have the ability to utilize softer binders, without the need for additional coalescant (solvents) for film formation, and still maintain sufficient hardness, toughness and lower tack in a dried film. Suitable applications for the coating compositions of the present invention may include architectural coatings (particularly low VOC applications for semi-gloss and gloss); factory applied coatings (metal and wood, thermoplastic and thermosetting); maintenance coatings (e.g., over metal); automotive coatings; concrete roof tile coatings; elastomeric roof coatings; elastomeric wall coatings; external insulating finishing systems; and inks. It is further contemplated that the aqueous nanocomposite dispersions, when provided as an additive to a coating application, may impart hardness. A further application for the aqueous nanocomposite dispersion is for an opaque polymer and hollow sphere pigments. The inclusion of the aqueous nanocomposite dispersions may provide, for example, harder, more collapse resistant shells or may be suitable for the modification of fibers. Yet further non-limiting examples of applications for the aqueous clay-polymer nanocomposite dispersions: polish; binders (such as binders for nonwovens, paper coatings, pigment printing, or ink jet); adhesives (such as pressure sensitive adhesives, flocking adhesives, or other water based adhesives); plastics additives; ion exchange resins; hair fixatives; caulks; traffic paint; and sealants. The aqueous clay-polymer nanocomposite dispersion may impart strength and toughness to the aforementioned applications.

In one embodiment of the present invention, the aqueous nanocomposite dispersions are capable of forming films upon drying (e.g., coatings and adhesives). In this embodiment, it is preferred that the polymers of the nanocomposites have a glass transition temperature in the range of from −80EC to 50EC. Glass transition temperatures may be calculated by using the Fox equation (see T. G. Fox, Bull. Am. Physics Soc., Vol. 1, Issue No. 3, page 123(1956)).

In another embodiment of this invention, caulking and sealant compositions containing an aqueous nanocomposite dispersion are provided. The various components, processes, and uses of the aforementioned coating compositions are preferably applicable to these nanocomposite-containing caulking and sealant compositions. In addition, caulking and sealant compositions preferably have a paste-like or gel-like consistency and preferably have higher viscosities than do coatings. Accordingly, caulks and sealants can be prepared using the aqueous nanocomposite dispersions of the present invention according to the general formulations known in the art of preparing caulks and sealants from emulsion polymers. In this embodiment, caulks and sealants can be prepared by blending fillers with the aqueous nanocomposite dispersions according to methods known in the art.

In some embodiments of this invention, the aqueous nanocomposite dispersions desirably form films upon drying, with or without the addition of plasticizers or coalescents (e.g., coatings and adhesives). In these embodiments, it is preferred that the polymers of the nanocomposites have glass transition temperatures in the range of from −80EC to 10EC.

In one embodiment of the present invention, a coating composition containing an aqueous nanocomposite dispersion using the modified clay of the present invention is prepared. The coating composition of this invention may include, for example, coating or paint compositions which may be described in the art as architectural coatings, maintenance coatings, factory-applied coatings, automotive coatings, elastomeric wall or roof coatings, exterior insulating finishing system coatings, paper or paperboard coatings, overprint varnishes, fabric coatings and backcoatings, leather coatings, cementitious roof tile coatings, and traffic paints. Alternatively, the coating or paint compositions may be described as clear coatings, flat coatings, satin coatings, semi-gloss coatings, gloss coatings, primers, textured coatings, and the like. In these embodiments, it is preferred that the polymers of the nanocomposites have glass transition temperatures in the range from 0EC to 70EC.

The coating compositions of the present invention may further include pigments and/or fillers such as, for example, titanium dioxide, iron oxide, zinc oxide, magnesium silicate, calcium carbonate, organic and inorganic colored pigments, and clays other than layered clay. Such pigmented coating compositions typically contain from 3 to 70% pigment on a volume basis, or more preferably from 15 to 60% titanium dioxide on a volume basis. The coating composition may be prepared by techniques that are well known in the coatings art. First, optionally, at least one pigment is dispersed within an aqueous medium under high shear such as is afforded by a COWLES® mixer or, alternatively at least one predispersed pigment may be used. Then, the aqueous nanocomposite dispersion may be added under low shear stirring along with other coatings adjuvants, as desired. Alternatively, the aqueous nanocomposite dispersion may be included in the optional pigment dispersion step. The coating composition may also contain conventional coatings adjuvants such as, for example, tackifiers, emulsifiers, coalescing agents, plasticizers, buffers, neutralizers, thickeners or rheology modifiers, humectants, crosslinking agents including heat-, moisture-, light-, and other chemical- or energy-curable agents, wetting agents, biocides, plasticizers, antifoaming agents, colorants, waxes, water repellants, slip or mar aids, anti-oxidants, and the like. The coating composition, in addition to the aqueous nanocomposite dispersion described herein, may also contain at least one additional polymer, preferably an additional emulsion polymer(s) selected from film-forming and non-film-forming emulsion polymers, including, but not limited to polymeric pigments, such as solid particles, particles having a single void, or multivoided particles. These additional polymers, if added to the coating composition of the present invention, may be present at a level of 0–200%, based on dry weight of the total dry polymer weight in the nanocomposite dispersion.

The solids content of the coating composition may be from 10% to 70% by volume. The viscosity of the coating composition may be from 0.05 to 100 Pascal-seconds (Pa.s), or 50 to 100,000 centipoise (cP), as measured using a Brookfield viscometer; the viscosities appropriate for different application methods vary considerably.

The coating composition may be applied by conventional application methods such as, but not limited to, brushing and spraying methods, roll coating, doctor-blade application, printing methods, air-atomized spray, air-assisted spray, airless spray, high volume low pressure spray, air-assisted airless spray, air knife coating, trailing blade coating, curtain coating, and extrusion.

The coating composition may be applied to a substrate such as, for example, paper or paperboard; consolidated wood products; glass; plastic; wood; metal; primed or previously painted surfaces; weathered surfaces; asphaltic substrates; ceramics; leather; and hydraulic substrates such as cement in 'green' or cured form, concrete, gypsum, and stucco. The coating composition applied to the substrate is typically dried, or allowed to dry, at a temperature from 10° C. to 95° C.

In another embodiment of this invention, an adhesive composition containing an aqueous nanocomposite dispersion is contemplated. The adhesive compositions may include, for example, those known in the art as pressure sensitive adhesives, laminating adhesives, packaging adhesives, hot melt adhesives, reactive adhesives, flocking adhesives, and flexible or rigid industrial adhesives. In these embodiments it is preferred that the polymers of the nanocomposites have glass transition temperatures in the range of from −80EC to 80EC. The adhesives are typically prepared by admixing optional pigment and the optional adjuvants listed herein above as coatings adjuvants. The adhesive compositions are typically applied to substrates including plastic substrates such as film, sheet, and reinforced plastic composites; metal foil; fabric; metal; glass; cementitious substrates; and wood or wood composites. Application to the substrates is typically effected on machine by transfer roll coater, e.g., or by manual application devices.

In another embodiment of this invention, a caulk or sealant composition containing an aqueous nanocomposite dispersion is contemplated. In these embodiments it is preferred that the polymers of the nanocomposites have glass transition temperatures in the range of from −80EC to 0EC. The caulk or sealant compositions are typically prepared by admixing pigment and such optional adjuvants listed hereinabove as coatings adjuvants as are appropriate. The caulk and sealant compositions are typically prepared at high solids content level such as 70 wt. % and above in order to minimize shrinkage on drying and consequently, may have a gel-like or paste-like consistency. Caulk and sealant compositions are typically applied to fill and/or seal junctions of substrates including metal; glass; cementitious substrates; wood or wood composites; and combinations thereof and are typically allowed to dry under ambient conditions.

In another embodiment of this invention, an ink composition containing an aqueous nanocomposite dispersion is contemplated. The ink compositions may include, for example, those known in the art as flexographic inks, gravure inks, ink jet inks, and pigment printing pastes. In these embodiments it is preferred that the polymers of the nanocomposites have glass transition temperatures in the range of from −50EC to 50EC. The inks are typically prepared by admixing optional pigment, predispersed pigment, or dyes and the optional adjuvants listed herein above as coatings adjuvants. The ink compositions are typically applied to substrates including plastic substrates such as film, sheet, and reinforced plastic composites; paper or paperboard; metal foil; fabric; metal; glass; cloth; and wood or wood composites. Application to the substrates is typically effected on machine by flexographic blankets, gravure rolls, and silk screens.

In another embodiment of this invention, a nonwoven fabric binder containing an aqueous nanocomposite dispersion is contemplated. The nonwoven binder compositions may include, for example, those known in the art as binders for consumer and industrial nonwovens such as wipes and interlining, binders for insulating nonwovens such as fiberfill and fiberglass, and binders/strengthening agents for nonwovens and paper such as oil filter paper. In these embodiments it is preferred that the polymers of the nanocomposites have glass transition temperatures in the range of from −60EC to 50EC. The nonwoven fabric binders are typically prepared by admixing optional pigment, and the optional adjuvants listed herein above as coatings adjuvants, as appropriate. The nonwoven fabric binder compositions are typically applied to substrates including nonwovens formed from cellulosic fibers such as paper and rayon; synthetic fibers such as polyester, aramid, and nylon; glass fibers and mixtures thereof. Application to the substrates is typically effected on machine by saturation bath, roll coater, spray, or the like.

In another embodiment of this invention, a polish containing an aqueous nanocomposite dispersion is contemplated. The polish compositions may include, for example, those known in the art as floor polishes, furniture polishes, and automobile polishes. In these embodiments it is preferred that the polymers of the nanocomposites have glass transition temperatures in the range of from 0EC to 50EC. The polishes are typically prepared by admixing optional pigment, and the optional adjuvants listed herein above as coatings adjuvants, as appropriate, particularly waxes. The polish compositions are typically applied to substrates including wood, vinyl or polyurethane flooring, ceramic tiles, painted metal, and the like. Application to the substrates is typically effected by spray, roller, mop, or the like.

In another embodiment of this invention, a plastics additive containing an aqueous nanocomposite dispersion is contemplated. The plastics additive compositions may include, for example, those known in the art as processing aids and impact modifiers. In these embodiments it is preferred that the polymers of the nanocomposites have glass transition temperatures in the range of from −50EC to 50EC. The plastics additives are typically prepared by admixing optional pigment, and the optional adjuvants listed herein above as coatings adjuvants, as appropriate, and, typically, drying the composition to a powdered form. The plastics additives compositions are typically mixed with the plastic such as, for example, polyvinyl chloride, polymethyl methacrylate and polypropylene, by milling or extrusion.

In a further aspect of the present invention, a digital imaging composition incorporating an aqueous nanocomposite dispersion and/or nanocomposite particles is contemplated. The term "digital imaging" as used herein generally relates to compositions that allow the reproduction of an image onto a substrate. Suitable applications for digital imaging compositions include toners for electrophotography such as xerography or compositions for ink jet printers or similar applications. The Tg and particle size for digital imaging compositions varies depending upon its method or system of use. Generally, digital imaging compositions for ink jet applications may have a lower particle size and Tg compared to the particle size and Tg for digital imaging compositions for electrophotography applications. For example, typical Tg values for ink jet applications may range from 45° C. to 60° C. whereas Tg values for electrophotography applications may range from 55° C. to 85° C. Further, non-limiting variables such as viscosity, surface tension, and pH of the digital imaging composition may also be adjusted based upon the end use of the composition.

The modified clays of the present invention may also be suitable as additives within engineering plastics compositions. Compositions that comprise the modified clays of the present invention may exhibit a balance of liquid and vapor barrier properties, flame retardancy, high service temperature, good thermal stability, processability, high strength, and high modulus. Useful fabricated articles made from these compositions include toughened sheet and gear moldings for bushings, bearings, housings, electrical tools, automotive parts, electric cases, packaging materials, plastic bottles, plastic coatings, and the like.

EXAMPLES

Example 1

Calcium+Oleic Acid

An aqueous dispersion of 100 g of PGV (sodium montmorillonite) clay from Nanocor, Inc of Arlington Heights, Ill. in 1000 g water is mixed at 85° C. for 30 minutes. An aqueous slurry of 8.89 g $Ca(OH)_2$ in 100 g water is introduced to the reactor vessel and stirred at 85° C. for 15 minutes. Finally, a 34.136 g quantity of oleic acid is introduced to the reactor. The resulting modified clay material is then collected by gravimetric methods.

Example 2

Reduced Clay Modified with Calcium+Oleic Acid

An aqueous dispersion of 100 g of PGV (sodium montmorillonite) clay from Nanocor, Inc of Arlington Heights, Ill. in 1000 g water is mixed at 85° C. for 30 minutes. Then, a 7.67 g quantity of a reductant, lykopon in 50 g of water is added, and the contents of the reactor are stirred for 15 minutes. An aqueous slurry of 8.89 g $Ca(OH)_2$ in 100 g water is introduced to the reactor vessel and stirred at 850° C. for 15 minutes. Finally, a 34.136 g quantity of oleic acid is introduced to the reactor. The resulting modified clay material is then collected by gravimetric methods.

We claim:

1. A process for preparing a modified clay, comprising:
providing a clay dispersion comprising at least one clay wherein said clay has a first exchangeable cation consisting of at least one naturally occurring cation;
adding a second multivalent inorganic cation to said clay dispersion, wherein at least a portion of the second cation exchanges with at least a portion of the first cation to form a modified clay dispersion; and
combining at least one neutralizing agent with said modified clay dispersion to provide a modified clay, wherein the said neutralizing agent is chosen from oleic acid, palmitic acid, succinic acid, tartaric acid, fatty acids, amino acids, sulfonic acids, alkyl sulfates, mixtures of the said acids, chloride, bromide, iodide, nitrite, acetate, a polymerizable surfactant having a partially negative charge, and a polymerizable surfactant having a completely negative charge.

2. The process of claim 1 wherein the second multivalent inorganic cation comprises a divalent or a trivalent cation.

3. The process of claim 1 wherein the first exchangeable cation comprises a monovalent cation.

4. The process of claim 3 wherein the first exchangeable cation comprises a sodium or potassium cation.

5. The process of claim 1 wherein the clay dispersion comprises a redox-active multivalent metal ion.

6. The process of claim 5 wherein an oxidant is added to the clay dispersion.

7. The process of claim 5 wherein a reductant is added to the clay dispersion.

8. The process of claim 5 wherein an oxidant and a reductant is added to the clay dispersion.

9. The process of claim 1 wherein the said neutralizing agent is selected from the group consisting of oleic acid, palmitic acid, succinic acid, tartaric acid, fatty acids, amino acids, sulfonic acids, alkyl sulfates, and mixtures thereof.

10. The process of claim 1, wherein the neutralizing agent is chosen from a polymerizable surfactant having a partially negative charge and a polymerizable surfactant having a completely negative charge.

11. The modified clay prepared according to the process of claim 1.

12. The modified clay of claim 11, wherein the clay comprises a modifier having a complex of the second cation and the neutralizing agent.

13. The modified clay of claim 12, wherein the modifier is intercalated within the clay.

14. A polymer clay nanocomposite comprising the modified clay of claim 11.

15. An aqueous polymer clay nanocomposite comprising the modified clay of claim 11.

16. A process for preparing a modified clay, comprising:

providing an aqueous clay dispersion comprising at least one clay wherein said clay has a first exchangeable cation, wherein said first cation consists of at least one naturally occurring cation;

combining an aqueous mixture comprising a second cation with said aqueous clay dispersion, wherein at least a portion of the second cation exchanges with at least a portion of the first cation to form a modified aqueous clay dispersion, and wherein said second cation comprises a multivalent inorganic cation; and adding at least one neutralizing agent to said modified aqueous clay dispersion to provide a modified clay wherein at least a portion of the neutralizing agent interacts with at least a portion of the second cation to form a modified clay, and, further wherein, the said neutralizing agent is chosen from oleic acid, palmitic acid, succinic acid, tartaric acid, fatty acids, amino acids, sulfonic acids, alkyl sulfates, mixtures of the said acids, chloride, bromide, iodide, nitrite, acetate, a polymerizable surfactant having a partially negative charge, and a polymerizable surfactant having a completely negative charge.

* * * * *